United States Patent
Van Phan et al.

(10) Patent No.: US 10,743,291 B2
(45) Date of Patent: Aug. 11, 2020

(54) RAN LEVEL COORDINATION

(71) Applicant: Nokia Solutions and Networks Oy, Espoo (FI)

(72) Inventors: Vinh Van Phan, Oulu (FI); Ling Yu, Kauniainen (FI); Peter Rost, Heidelberg (DE); Xiang Xu, Jiangsu (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/099,252

(22) PCT Filed: May 12, 2016

(86) PCT No.: PCT/EP2016/060676
§ 371 (c)(1),
(2) Date: Nov. 6, 2018

(87) PCT Pub. No.: WO2017/194115
PCT Pub. Date: Nov. 16, 2017

(65) Prior Publication Data
US 2019/0215803 A1 Jul. 11, 2019

(51) Int. Cl.
*H04W 4/00* (2018.01)
*H04W 72/04* (2009.01)
(Continued)

(52) U.S. Cl.
CPC ......... *H04W 72/04* (2013.01); *H04W 16/14* (2013.01); *H04W 36/0061* (2013.01)

(58) Field of Classification Search
CPC .. H04W 72/04; H04W 92/20; H04W 36/0061
See application file for complete search history.

(56) References Cited

U.S. PATENT DOCUMENTS

2009/0003282 A1* 1/2009 Meylan ............... H04L 47/10
370/331
2014/0286243 A1* 9/2014 Yamada ............. H04W 72/042
370/329
(Continued)

FOREIGN PATENT DOCUMENTS

WO    WO 2011/133708 A1    11/2011

OTHER PUBLICATIONS

3GPP TSG RAN Meeting #71, Gothenberg, Sweden, Mar. 7-10, 2016, RP-160571 (rev. of RP-160311), "New SI Proposal: Study on HSPA and LTE Joint Operation", China Unicom, clean and marked versions, 10 pgs.
(Continued)

*Primary Examiner* — Barry W Taylor
(74) *Attorney, Agent, or Firm* — Harrington & Smith (57) ABSTRACT

It is provided a method, including monitoring if a capability information on a capability of a first network for semi-persistent scheduling of a resource for a terminal is received; determining, if the capability information is received, a second allocation scheme of the resource for the terminal such that an allocation of the resource according to the second allocation scheme is not in conflict with an allocation of the resource according to a first allocation scheme derived from the received capability information; controlling an allocation device of a second network to allocate the resource to the terminal according to the second allocation scheme.

20 Claims, 3 Drawing Sheets

(51) Int. Cl.
*H04W 16/14* (2009.01)
*H04W 36/00* (2009.01)

(56) References Cited

U.S. PATENT DOCUMENTS

| | | | |
|---|---|---|---|
| 2015/0223212 A1* | 8/2015 | Der Velde | H04L 5/0032 370/329 |
| 2018/0091269 A1* | 3/2018 | Ratilainen | H04B 7/02 |
| 2018/0124648 A1* | 5/2018 | Park | H04W 36/0005 |
| 2019/0261395 A1* | 8/2019 | Goektepe | H04W 72/1205 |

OTHER PUBLICATIONS

3GPP TSG RAN WG3 #91bis, Bangalore, India, Apr. 11-15, 2016, R3-160837, "On concurrent UMTS CS and LTE PS operation", Qualcomm Incorporated, 7 pgs.
3GPP TR 23.799 V0.3.0 (Jun. 2016), "$3^{rd}$ Generation Partnership Project; Technical specification Group Services and System Aspects; Study on Architecture for Next Generation System (Release 14)", 52 pgs.
3GPP TR 36.885 (V.1.0.0 (Mar. 2016), "$3^{rd}$ Generation Partnership Project; Technical Specification Group adio Access Network; Study on LTE-based V2X Services; (Release 14)", 88 pgs.
3GPP TS 36.300 V13.3.0 (Mar. 2016), "$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 295 pgs.

* cited by examiner

RAN LEVEL COORDINATION

This patent application is a U.S. National Stage application of International Patent Application Number PCT/EP2016/060676 filed May 12, 2016, which is hereby incorporated by reference in its entirety.

FIELD OF THE INVENTION

The present invention relates to an apparatus, a method, and a computer program product related to RAN level coordination. More particularly, the present invention relates to an apparatus, a method, and a computer program product related to RAN level coordination if multiple RANs may serve a UE simultaneously.

Abbreviations 3G, 4G, 5G $3^{rd}$, $4^{th}$, $5^{th}$ generation
3GPP $3^{rd}$ Generation Partnership Project
AP Access Point
C-DRX Connected Mode DRX
CS Circuit Switched
D2D Device to Device (communication)
DCH Dedicated Channel
DRX Discontinuous Reception
eNB evolved NodeB
HO Handover
HSPA High Speed Packet Access
ID Identifier
LTE Long Term Evolution
LTE-A LTE-Advanced
MBMS Multimedia Broadcast Multicast Service
P-cell Primary cell
PLMN Public Land Mobile Network
ProSe Proximity Service
PS Packet Switched
QoS Quality of Service
RAN Radio Access Network
RAT Radio Access Technology
Rel Release
RRC Radio Resource Control
Rx Receive
SA System Architecture
S-cell Secondary cell
SI Study Item
SIB System Information Block
SPS Semi-persistent Scheduling
TR Technical Report
TSG Technical Specification Group
Tx Transmit
UE User Equipment
UL Uplink
UMTS Universal Mobile Telecommunication System
UTRAN UMTS Terrestrial RAN
V2X Vehicle to anything
WiFi Wireless Fidelity

BACKGROUND OF THE INVENTION

3GPP Rel' 14 discusses several study items including SI on V2X communications, SI on HSPA and LTE joint operation, SI on next generation networks (5G), targeted for standardization in 3GPP Rel' 14 and beyond.

3GPP TR 36.885 TSG RAN Study on LTE-based V2X Services (Rel' 14) [1] describes the operation aspects based on which the following possible scenarios for multi-operator supports need to be considered:

Scenario 1: (shared eNB) Operator A deploys an eNB shared with Operator B.

Scenario 2: (non-shared) Both Operator A and B have eNBs in a specific area. Operator A's UE sends a V2X packet, which is further sent to Operator B's eNB for broadcasting.

Scenario 3: (non-shared) Only Operator A has eNB in a specific area. Operator B's UE can only receive MBMS V2X packets from A's eNB.

Scenario 4: (non-shared) Only Operator A has eNB in a specific area. Operator B's UE can transmit, and receive MBMS V2X packets via A's eNB It may not be a valid use case. Pending on RAN1/2 decision.

Scenario 5: (non-shared, V2X using a dedicated PLMN ID) Both Operator A and B have eNB in a specific area. A's eNB broadcasts its own PLMN ID and the V2X PLMN ID. But B's eNB only broadcasts its own PLMN ID. Operator B's UE can transmit, and receive MBMS V2X packets via A's eNB.

One main challenge may be related to Scenario 5: how B's UE can use both LTE service and V2X service simultaneously?

3GPP RP-160571 [2] proposes a new SI on HSPA and LTE joint operation. It has been identified that even if 3G and 4G are operating in separate carriers, UE with capability limitation of a single Tx chain (1Tx) for 3GPP RAT(s) may have to dynamically switch the transmission in 3G and 4G for simultaneous 3G/4G services. This implies a need for coordination between the serving 3G and 4G RANs to schedule for UE transmissions.

3GPP TR 23.799 TSG SA Study on Architecture for Next Generation System (Rel' 14) [3] describes many key issues including network-slicing, network capability exposure, interworking and migration. For examples, open questions for the network-slicing key issue include: how to enable operators to use the network slicing concept to efficiently support multiple 3rd parties (e.g. enterprises, service providers, content providers, etc.); how to enable a UE to simultaneously obtain services from one or more specific network slice instances. Here, resource sharing across network slices (including spectrum, synchronization or timing, and hardware/software processing resources of both UE and network sides) may be expected; and hence there may be a need for coordination between the involved serving-RANs belonging to different network slices which UE are getting services from simultaneously. There are many challenging vertical use cases which pose severe problems in terms of practical resource sharing and optimization across network slices. For examples, in automotive or factory-automation use cases, regulators or factory owners may question how the network slicing can guarantee the required QoS for safety critical information or in terms of ultra-high reliability and ultra-low latency while running broadband on the same network.

Based on the above examples, it can be generalized that in future mobile networks UE may be provided with multiple radio connections served by multiple RANs of potentially different administrative network domains, technologies, and/or systems (due to different operators, network slices, RATs, APs or operation modes, etc.) for multiple corresponding services simultaneously. RAN level coordination between those serving RANs of the UE is needed to avoid any possible conflicts in terms of scheduled resources for the UE to transmit and/or receive in different serving RANs, especially when resources (including Tx/Rx chain of the UE and spectrum) may be shared between different serving RANs.

If a UE is equipped with multiple, dedicated and exclusive hardware/software resources corresponding to multiple serving RANs operating on exclusive non-interfering carriers then there may be no need for RAN level coordination. For examples, today's UE may already use one of 3GPP RAT (2G/3G/4G) and some non-3GPP RAT (WiFi or Bluetooth) simultaneously.

In current LTE carrier aggregation or RAN level multi-connectivity, RAN-level coordination between P-Cell and S-Cell is considered as intra-RAN functionality and fully under control of the serving RAN (P-Cell) [4]. There is no need for UE to be involved in that RAN level coordination.

It is also known that possible RAN-level coordination between multiple serving RANs may be realized via either UE or network side; and the former option might be seen as the fastest way for RAN-level coordination. One good example for the UE assisted option can be found in coordination between Uu and PC5 transmissions of UE involved in ProSe communications over PC5 in parallel with regular cellular access communications using same UL carrier resources or single Tx chain of UE [4]. This is based on using possible UE assistance information, indicating about autonomous D2D communications UE is involved to the serving RAN, coupled with prioritization of UE transmissions on Uu vs. PC5 controlled by the serving RAN. However, ProSe D2D transmission of individual UE is rather tightly integrated and controlled by single serving RAN. RAN level coordination for ProSe D2D communications of individual UE with possible multiple serving RANs in multi-operator scenarios has not been addressed much. This is more or less the same as the problem or challenge with V2X scenarios addressed in the previous section.

The SI proposed in [2], R3-160837 on concurrent UMTS CS and LTE PS operation [5] describes, at high level, a possible solution based on few key assumptions and proposals/enhancements. These include RAN-aware 3G CS and LTE PS concurrent operation, based on Dual-Rx/Single-Tx UE wherein UL Tx sharing is enabled by the suitable transmission gaps supported by 3G DCH Enhancement and LTE PS C-DRX operation/features. R3-160837 also considers timing-alignment aspects to operate efficiently in such UL-Tx sharing operation. For that R3-160837 suggests that a simple approach, with minimal impacts to RAN (e.g. no need for inter-RAN coordination/synchronization), is to rely on UE detecting/reporting potential misalignments (e.g. over UTRAN, via existing or new time-offset triggers/indications).

REFERENCES

[1] 3GPP TR 36.885 TSG RAN Study on LTE-based V2X Services (Rel' 14)
[2] 3GPP RP-160571 SI proposal: HSPA and LTE Joint Operation (Rel' 14)
[3] 3GPP TR 23.799 TSG SA Study on Architecture for Next Generation System (Rel' 14)
[4] 3GPP TS 36.300 E-UTRA and E-UTRAN Overall Description, Stage 2 (Rel'13)
[5] 3GPP TSG RAN WG3 #91bis R3-160837 On concurrent UMTS CS and LTE PS operation (Qualcomm, April/2016)

SUMMARY OF THE INVENTION

It is an object of the present invention to improve the prior art.

According to a first aspect of the invention, there is provided an apparatus, comprising monitoring means adapted to monitor if a capability information on a capability of a first network for semi-persistent scheduling of a resource for a terminal is received; determining means adapted to determine, if the capability information is received, a second allocation scheme of the resource for the terminal such that an allocation of the resource according to the second allocation scheme is not in conflict with an allocation of the resource according to a first allocation scheme derived from the received capability information; control means adapted to control an allocation device of a second network to allocate the resource to the terminal according to the second allocation scheme.

The capability information may comprise information on the semi-persistent scheduling actually applied by the first network for the terminal; and the determining means may be adapted to determine the second allocation scheme such that the second allocation scheme is not in conflict with the actually applied semi-persistent scheduling by the first network.

According to a second aspect of the invention, there is provided an apparatus, comprising providing means adapted to provide a capability information on a capability of a network for semi-persistent scheduling of a resource for a terminal; controlling means adapted to control an allocation device of the network to allocate the resource semi-persistently to the terminal according to the capability.

The capability information may comprise information on the semi-persistent scheduling actually applied by the network for the terminal.

According to a third aspect of the invention, there is provided an apparatus, comprising monitoring means adapted to monitor if a first capability information on a capability of a first network for semi-persistent scheduling of a resource is received; generating means adapted to generate a second capability information on the capability of the first network for semi-persistent scheduling of the resource based on the first capability information if the first capability information is received; providing means adapted to provide the second capability information to a second network.

The generating of the second capability information may comprise translating first parameters of the first network comprised in the first capability information into second parameters of the second network comprised in the second capability information.

The apparatus may further comprise communicating means adapted to communicate with the first network using the resource and to communicate with the second network using the resource.

According to a fourth aspect of the invention, there is provided an apparatus, comprising checking means adapted to check if more than one of plural networks serving a terminal schedule a resource dynamically for the terminal; requesting means adapted to request, if more than one of the networks schedules the resource dynamically for the terminal, at least one of the dynamically scheduling networks to schedule the resource for the terminal semi-persistently such that not more than one of the networks schedules the resource dynamically for the terminal.

According to a fifth aspect of the invention, there is provided an apparatus, comprising monitoring means adapted to monitor if a service is to be provided to a terminal by a resource of an additional network not yet serving the terminal; selecting means adapted to select, if the service is to be provided, not more than one network of one or more serving networks and the additional network to allocate the resource to the terminal dynamically, wherein each of the one or more serving networks is serving the terminal; requesting means adapted to request each one of the one or more serving networks and the additional network not selected by the selecting means to allocate the resource for the terminal semi-persistently.

The selecting means may be adapted to select the not more than one network based on respective received capability information on a capability of the respective network for semi-persistent scheduling of the resource for the terminal.

The apparatus may further comprise checking means adapted to check if a first network of the one or more serving networks allocates the resource to the terminal semi-persistently; controlling means adapted to control the requesting means not requesting the first network to allocate the resource semi-persistently if it is checked that the first network allocates the resource to the terminal semi-persistently.

According to a sixth aspect of the invention, there is provided an apparatus, comprising monitoring circuitry configured to monitor if a capability information on a capability of a first network for semi-persistent scheduling of a resource for a terminal is received; determining circuitry configured to determine, if the capability information is received, a second allocation scheme of the resource for the terminal such that an allocation of the resource according to the second allocation scheme is not in conflict with an allocation of the resource according to a first allocation scheme derived from the received capability information; control circuitry configured to control an allocation device of a second network to allocate the resource to the terminal according to the second allocation scheme.

The capability information may comprise information on the semi-persistent scheduling actually applied by the first network for the terminal; and the determining circuitry may be configured to determine the second allocation scheme such that the second allocation scheme is not in conflict with the actually applied semi-persistent scheduling by the first network.

According to a seventh aspect of the invention, there is provided an apparatus, comprising providing circuitry configured to provide a capability information on a capability of a network for semi-persistent scheduling of a resource for a terminal; controlling circuitry configured to control an allocation device of the network to allocate the resource semi-persistently to the terminal according to the capability.

The capability information may comprise information on the semi-persistent scheduling actually applied by the network for the terminal.

According to a eighth aspect of the invention, there is provided an apparatus, comprising monitoring circuitry configured to monitor if a first capability information on a capability of a first network for semi-persistent scheduling of a resource is received; generating circuitry configured to generate a second capability information on the capability of the first network for semi-persistent scheduling of the resource based on the first capability information if the first capability information is received; providing circuitry configured to provide the second capability information to a second network.

The generating of the second capability information may comprise translating first parameters of the first network comprised in the first capability information into second parameters of the second network comprised in the second capability information.

The apparatus may further comprise communicating circuitry configured to communicate with the first network using the resource and to communicate with the second network using the resource.

According to a ninth aspect of the invention, there is provided an apparatus, comprising checking circuitry configured to check if more than one of plural networks serving a terminal schedule a resource dynamically for the terminal; requesting circuitry configured to request, if more than one of the networks schedules the resource dynamically for the terminal, at least one of the dynamically scheduling networks to schedule the resource for the terminal semi-persistently such that not more than one of the networks schedules the resource dynamically for the terminal.

According to a tenth aspect of the invention, there is provided an apparatus, comprising monitoring circuitry configured to monitor if a service is to be provided to a terminal by a resource of an additional network not yet serving the terminal; selecting circuitry configured to select, if the service is to be provided, not more than one network of one or more serving networks and the additional network to allocate the resource to the terminal dynamically, wherein each of the one or more serving networks is serving the terminal; requesting circuitry configured to request each one of the one or more serving networks and the additional network not selected by the selecting circuitry to allocate the resource for the terminal semi-persistently.

The selecting circuitry may be configured to select the not more than one network based on respective received capability information on a capability of the respective network for semi-persistent scheduling of the resource for the terminal.

The apparatus may further comprise checking circuitry configured to check if a first network of the one or more serving networks allocates the resource to the terminal semi-persistently; controlling circuitry configured to control the requesting circuitry not requesting the first network to allocate the resource semi-persistently if it is checked that the first network allocates the resource to the terminal semi-persistently.

According to an eleventh aspect of the invention, there is provided a method, comprising monitoring if a capability information on a capability of a first network for semi-persistent scheduling of a resource for a terminal is received; determining, if the capability information is received, a second allocation scheme of the resource for the terminal such that an allocation of the resource according to the second allocation scheme is not in conflict with an allocation of the resource according to a first allocation scheme derived from the received capability information; controlling an allocation device of a second network to allocate the resource to the terminal according to the second allocation scheme.

The capability information may comprise information on the semi-persistent scheduling actually applied by the first network for the terminal; and the second allocation scheme may be determined such that the second allocation scheme is not in conflict with the actually applied semi-persistent scheduling by the first network.

According to a twelfth aspect of the invention, there is provided a method, comprising providing a capability information on a capability of a network for semi-persistent scheduling of a resource for a terminal; controlling an allocation device of the network to allocate the resource semi-persistently to the terminal according to the capability.

The capability information may comprise information on the semi-persistent scheduling actually applied by the network for the terminal.

According to a thirteenth aspect of the invention, there is provided a method, comprising monitoring if a first capability information on a capability of a first network for semi-persistent scheduling of a resource is received; generating a second capability information on the capability of the first network for semi-persistent scheduling of the resource based on the first capability information if the first capability information is received; providing the second capability information to a second network.

The generating of the second capability information may comprise translating first parameters of the first network comprised in the first capability information into second parameters of the second network comprised in the second capability information.

The method may further comprise communicating with the first network using the resource and communicating with the second network using the resource.

According to a fourteenth aspect of the invention, there is provided a method, comprising checking if more than one of plural networks serving a terminal schedule a resource dynamically for the terminal; requesting, if more than one of the networks schedules the resource dynamically for the terminal, at least one of the dynamically scheduling networks to schedule the resource for the terminal semi-persistently such that not more than one of the networks schedules the resource dynamically for the terminal.

According to a fifteenth aspect of the invention, there is provided a method, comprising monitoring if a service is to be provided to a terminal by a resource of an additional network not yet serving the terminal; selecting, if the service is to be provided, not more than one network of one or more serving networks and the additional network to allocate the resource to the terminal dynamically, wherein each of the one or more serving networks is serving the terminal; requesting each one of the one or more serving networks and the additional network not selected for allocating the resource dynamically to allocate the resource for the terminal semi-persistently.

The not more than one network may be selected based on respective received capability information on a capability of the respective network for semi-persistent scheduling of the resource for the terminal.

The method may further comprise checking if a first network of the one or more serving networks allocates the resource to the terminal semi-persistently; controlling not requesting the first network to allocate the resource semi-persistently if it is checked that the first network allocates the resource to the terminal semi-persistently.

Each of the methods of the eleventh to fifteenth aspects may be a method of RAN level coordination.

According to a sixteenth aspect of the invention, there is provided an apparatus comprising at least one processor, at least one memory including computer program code, and the at least one processor with the at least one memory and the computer program code, being arranged to cause the apparatus to at least perform at least one of the methods according to the eleventh to fifteenth aspects.

According to a seventeenth aspect of the present invention, there is provided a computer program product comprising a set of instructions which, when executed on an apparatus, is configured to cause the apparatus to carry out the method according to any of the eleventh to fifteenth aspects. The computer program product may be embodied as a computer-readable medium or directly loadable into a computer.

According to some example embodiments of the invention, at least one of the following technical effects may be provided:
the UE may be served by plural networks with at least partly overlapping resources;
coordination effort is minimized; and
impact on legacy systems is minimized.

BRIEF DESCRIPTION OF THE DRAWINGS

Further details, features, objects, and advantages are apparent from the following detailed description of example embodiments of the present invention which is to be taken in conjunction with the appended drawings, wherein.

DETAILED DESCRIPTION OF CERTAIN EXAMPLE EMBODIMENTS

Herein below, certain example embodiments of the present invention are described in detail with reference to the accompanying drawings, wherein the features of the example embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

An open problem or main challenge for scenarios with a UE having multiple radio connections served by multiple RANs is making the coordination of the scheduling of one or more resources (e.g. time slots, frequency bands) by these RANs simple and effective, in particular if they provide corresponding services. This task might be quite challenging because the networks may potentially belong to different administrative network domains, technologies, and/or systems (due to different operators, network slices, RATs, APs or operation modes, etc.). Fast and effective coordination means that the coordination is as fast as possible with low signalling and processing overhead and having least impact on individual RANs. It would be advantageous if such coordination would not impact legacy systems. The coordination should be on UE basis.

Some embodiments of the invention provide a method for simple and effective RAN level coordination between multiple serving RANs (potentially) serving a UE in the aforementioned scenarios so as to avoid conflicts in terms of scheduled resources and or Tx/Rx chain for the UE to transmit and receive reliably in different serving RANs, especially when resources (including Tx/Rx chain of the UE and spectrum) may not be exclusively available for individual radio access technologies. A conflict in terms of Tx/Rx chain may occur even if the scheduled resources are orthogonal (in frequency) but the limitation of the Tx/Rx chain would not allow for accessing both at the same time (basically due to the orthogonality of the resources).

According to some embodiments of the invention, semi-persistent scheduling (SPS) based resource allocation and related coordination across the multiple serving RAN is utilized as much as possible. That is, in a preferable operation, not more than one of the multiple serving RAN may use fully dynamic scheduling per TTI to serve the UE, the remaining serving RANs use coordinated SPS.

In semi-persistent scheduling, higher layers (e.g. RRC) configure the UE with scheduling information for a plurality of TX/RX occasions. For example, a resource for a UE may be scheduled with a certain periodicity $t_p$ and a reference time $t_0$. Then, both the network and the UE know that the resource is scheduled for the UE at times $t_0+n*t_p$ (n: integer) until another scheduling command is received. The same may apply correspondingly to the frequency domain. It may also apply to a combination of time domain and frequency domain. More complex semi-persistent scheduling algorithms may be applied. E.g., the period may get longer as time passes.

The reasons for the SPS based coordination are: (i) to reduce frequent exchanges of scheduled resources as well as to simplify and fasten RAN level coordination; and (ii) to allow adaptive operation of SPS and possible dynamic scheduling among involved serving RANs in a predictable or practical way while providing multiple required services to the UE simultaneously.

Some features according to some embodiments of the invention include:
  (i) exposing SPS capability or configuration of one serving RAN to another serving RAN via either the UE or the network-side coordination;
  (ii) new triggering conditions and control-signalling elements for fast UE based
  RAN level coordination related to SPS; and
  (iii) SPS capability based control of the UE operation when being served by multiple RANs for multiple corresponding services simultaneously.

In the following, it is assumed that multiple serving RANs of the UE belong to different parties (administrative network domains, radio technologies or systems of different operators, network slices, RATs, APs or operation modes, etc., which are corresponding to different services of the UE) but the invention is not limited thereto. For example, one operator may own two jointly or separately administered networks after a merger of two former operators each owning their own networks. In some embodiments of the invention, the UE may be considered as a native or home UE to some of the serving RANs and a visitor UE to other RANs of the serving RANs.

Some detailed proposals according to some embodiments of the invention are described hereinafter.

In some embodiments, the relevant RANs (which are equipped and configured to support (serve) a UE being served simultaneously by multiple serving RANs for multiple corresponding services) may expose their SPS capability to each other. E.g., they may expose their SPS capability to each other if one of the scenarios described hereinabove applies.

SPS capability may include, e.g., an indication whether and how SPS is supported. It may further comprise SPS related system items and constraints such as RAT specific characteristics, timing or synchronization references, resources and resource allocation granularities (physical resource blocks, SPS periods, SPS time slots or occasions within SPS periods, Tx power and transport format, etc.). The indication how SPS is supported may also include whether or not SPS can be provided to a visitor UE directly or only indirectly via a home UE which has a D2D connection with the visitor UE.

SPS capability of relevant RANs (individual eNBs or cells), at least in part, may be advertised by corresponding eNB in SIB# (e.g., one of SIB1, SIB2, and SIB3) as cell-specific common information. This allows UEs to obtain SPS capability information in advance. Thus, the UE may determine in advance whether or not it is suitable to have multiple services simultaneously served by plural RANs and select most suitable serving RAN(s) to request for corresponding services. Thus, unnecessary request and coordination later on may be prevented.

For example, if none of the potentially serving RANs supports SPS, the UE may not use plural services served by different RANs, while it may potentially use plural services served by different RANs if not more than one (i.e., none or one) of the RANs does not support SPS. The UE may select some of the RANs such that not more than one (i.e., none or one) of the selected RANs does not support SPS.

In some embodiments, a UE may also be preconfigured (or configured by a current serving RAN on the fly) to indicate SPS capability of detected potentially serving RAN(s) to the currently serving RAN, e.g. as an extended part of inter-cell measurement and reporting. In turn, the currently serving RAN may configure UE with one or more of an indication of RANs being best possible candidates for serving the UE, selection rules, and operation priorities for the other potentially serving RANs for a case multiple serving RANs are needed/selected by the UE. For examples, the current serving RAN may determine best possible candidates of other potentially serving RANs for the UEs according to, e.g., highest levels of compatibility and time-alignment between SPS capabilities of the current serving RAN and other RAN(s); highest levels of flexibility and adaptability for the current serving RAN which may or may not be using SPS in serving the UE at the moment; best options considering for the UE's capability, need, and energy efficiency; and so forth.

UE may also be preconfigured (or configured by RAN) to request SPS explicitly or implicitly from a currently serving RAN. For example, UE may request the currently serving RAN to schedule semi-persistently before selecting an additional serving RAN if UE has no SPS allocation yet and the selected additional serving RAN is not able to provide SPS, or if the corresponding service to be provided by the selected additionally serving RAN is not optimized for SPS. In another example, UE may request a selected additionally serving RAN to schedule semi-persistently when the UE requests the corresponding service, because the currently serving RAN keeps using dynamic scheduling for the current services of UE (e.g. because it is not able for SPS, or the current services are not optimized for SPS).

The information on SPS capability of relevant RANs (individual eNBs or cells), at least in part, may be shared among relevant serving RANs on the fly via a UE potentially being served by them. In this option, a serving RAN may provide both cell specific and UE specific SPS related information to the UE to indicate this information to other relevant RAN(s). The UE specific SPS related information may include actual SPS allocation of the UE which may be none (i.e., the UE specific SPS related information might be omitted if UE does not have an SPS allocation).

In some embodiments, SPS capability of relevant RANs (individual eNBs or cells), at least in part, may be shared among relevant serving RANs beforehand (cell specific part) or on the fly (UE specific part and optionally the cell specific part, too) via a corresponding network-side interworking entity.

The information about SPS capability of relevant RANs (individual eNBs or cells) may also further specify some inter-dependences between SPS and dynamic scheduling capabilities or operations within individual RANs. These, for examples, may include priority or preference for applying one of the scheduling modes (dynamic scheduling, semi-persistent scheduling) in general operation or in specified operational scenarios, applications or services because individual RANs may provide both, scheduled and SPS services, as supported for different UEs and services.

The indicated SPS capability may apply to frequency and time domain and/or spatial domain with respect to individual RANs.

Note that coordination between multiple serving RANs in this option may be transparent or visible to the UE, depending on the implementation. If the coordination is transparent for the UE, the UE is relaying or forwarding the messages for involved RANs. This option requires involved RANs using the same language at least with respect to the RAN level coordination.

If the coordination is "visible" for the UE, information exchanged between the involved RANs on SPS may be at least to some extent decodable to the UE. In such an implementation, the UE may make use of the coordination information, too.

An example of a visible coordination information is as follows: A serving RAN may configure or reconfigure SPS allocation to the UE. Hence, the UE has to decode this message. The UE may apply the SPS according to this message. The same message may be used to indicate the SPS by the serving network to other serving RANs.

As another example, if a serving RAN wants to update cell specific SPS related information but not UE specific allocation and share the cell specific SPS related information with other serving RAN(s), the serving RAN may provide the UE with an update of the cell specific SPS related information only. The UE may then determine: (i) whether or not the current UE specific SPS related information allocated to the UE is still valid; and (ii) whether the UE needs to include the UE specific SPS related information in the indication to indicate the update of the cell-specific part to other serving RAN(s) or not. If (ii) is answered affirmative ("YES"), at least in case another serving RAN has not received the UE specific part before, the UE will then provide the UE specific part to the other serving RAN. In some embodiments, in order to ensure that the other RANs are always informed, the UE may always include the UE specific part in the indication to be sent to other serving RAN(s).

In some embodiments, where the coordination messages are visible to the UE, the UE may be capable to translate (mediate) SPS capability information, such as cell specific or UE specific SPS capability information, at least in part, of relevant RANs from one to another for coordination between relevant RANs. For example, UE may translate some parameter(s) for SPS used in a 3GPP network to corresponding parameter(s) of a WiFi network (in general: from one RAT to another RAT different therefrom). This aims to avoid or minimize impacts on legacy RANs. Other example constellations where translation would be useful are RANs with different modes or different versions of a same RAT.

In one embodiment, SPS based coordination among multiple serving RANs of the targeted UE and corresponding services may be specified in such a way that not more than one of the serving RANs may use dynamic scheduling which needs to be adapted to SPS based allocation of the other serving RANs. This depends on QoS requirements of corresponding services and SPS capabilities of individual serving RANs as well as UE capability. If a UE selects a serving RAN to use the dynamic scheduling for the targeted UE, the network may nevertheless decide to use SPS for the targeted UE.

UE may check from time to time and/or event-based if the number of dynamically scheduling networks for the UE is not larger than 1. Such a triggering event could be e.g. a conflict of the scheduling information received from two networks. If the UE recognizes that more than one network schedules the resource dynamically for the UE, the UE may select one (or none) of the networks for dynamic scheduling and the other RAN(s) for semi-persistent scheduling. In particular, the UE may request at least as many networks as necessary to schedule the resource semi-persistently, such that, as a result, not more than one network schedules dynamically. Te UE may also perform such selection if another RAN is to be added for serving the UE.

The UE may base its selection based on at least one of the followings for examples: existing resource allocations provided by the serving networks, SPS capability of the individual serving networks and the additional network, and default scheduling mode of the additional network the UE, which is the scheduling mode the respective RAN is expected to begin with at least for the service setup phase. For an example, if all the serving networks are currently providing the UE with SPS allocations and the UE determines that there is still sufficient gap in time or other accountable dimensions of resource allocation then the UE may select the additional network for dynamic scheduling. This way causes least impacts on the existing operation of the serving networks. For another example, if one of the serving networks is serving the UE with dynamic scheduling and the additional network is capable to provide the UE with SPS allocation for the service to be provided then the UE may keep selecting the currently dynamically scheduling serving network for the dynamic scheduling, and requesting the additional network to schedule semi-persistently. For yet another example, if the additional network, e.g. as the best possible option for the UE among selectable additional networks for the service to be provided, is not able to provide SPS allocation for the UE, or SPS allocation is not provisioned or recommended for the service to be provided then the UE just selects the additional network for dynamic scheduling.

Furthermore, UE capability and provisioned nature of the service to be provided (service type and characteristics or requirements), provisioned or preconfigured rules and restrictions of the individual serving networks and additional network related to supports of multiple services provided by multiple serving RANs with possible coordination (other than SPS capabilities) may be taken into account. For examples, if the service to be provided is an infrequent but intense (high data volume coming in short burst from time to time) machine-type messaging or data service than dynamic scheduling may be preferable for this service and therefore the UE may select the additional network to provide that. In some cases, the preconfigured rule or restriction of a serving network does not allow for changing scheduling mode or corresponding resource allocation often enough that may impact the decision of the UE. It is noted that in some cases, the UE may use random selection.

In some embodiments, the UE may keep a kind of history which of the networks schedules dynamically and/or which of the networks schedules semi-persistently. In these embodiments, after some time, the UE may select a RAN to schedule dynamically or semi-persistently or both based on the history.

In some embodiments, the UE may finally decide which RAN (if any) schedules dynamically, and which RAN(s) schedule semi-persistently. In other embodiments, a RAN (or a network based control entity) may finally decide which RAN (if any) schedules dynamically, and which RAN(s) schedule semi-persistently. For such a decision, the deciding RAN may or may not use an indication provided by the UE, which may be based on a selection as indicated hereinabove.

More particular, in cellular networks, network-controlled operations are preferred. The UE should always know in which scheduling mode(s) the UE is being served by a serving RAN. In this regard, the UE may typically not be allowed to make a decision which of the serving RANs is to schedule dynamically or semi-persistently or both. This is up to the coordination between the serving RANs for the UE based on corresponding request/indication from the UE. Hence, whenever a new serving RAN, in addition to the current serving RAN(s), is needed to serve a corresponding service request of the UE, a necessary coordination between the serving RANs may be triggered. It is noted that the UE may indicate the SPS capability of the current serving RAN(s) as well as request SPS allocation to/from the new serving RAN as soon as possible, e.g., during the connection setup phase with the new serving RAN. The UE may also indicate about the new serving RAN to the current serving RAN(s) as soon as the UE selects the new serving RAN to establish a new connection so that the current serving RAN(s) may initiate necessary coordination between the serving RANs as well as reconfigure the UE so as to support adding the new serving RAN for the UE.

In case that the current serving RAN decides to keep using the dynamic scheduling mode and the new serving RAN is also using the dynamic scheduling mode by default during the connection setup phase, the current serving RAN may avoid scheduling for the UE or configure the UE to give priority for the new serving RAN at least for completing the connection setup (within a preconfigured time interval). It is also noted that in case one of the current serving RAN(s) is in control of the addition of a new serving RAN as well as the coordination between the serving RAN for the UE, the UE may request the new serving RAN via the current serving RAN. Then the current serving RAN may initiate an upcoming connection setup for the UE with the new serving RAN and get a SPS allocation from the new serving RAN for the UE prior to the actual connection setup between the UE and the new serving RAN taking place.

If it is not possible to have not more than one dynamically scheduling RAN for the UE while the other RANs schedule semi-persistently, in particular due to missing SPS capabilities of some of the serving networks, UE may detach from some of these networks such that the desired number of dynamically scheduling networks (0 or 1) is achieved. In another example, UE may alternate between those dynamically scheduling RANs as serving RANs according to some preconfigured prioritization scheme, at least for a certain preconfigured duration. This might be useful if the UE expects that the conflict is temporary and may be resolved. For example, the UE may give priority for the new RAN for the connection and service to be set up.

UE knows from the information received with respect to the semi-persistent scheduling (such as the time period $t_p$) whether or not a certain network schedules the resource semi-persistently.

Each individual serving RANs may use either SPS or dynamic scheduling or both for other UEs than the targeted one. Two, possibly overlaying, cells may use different assignments of dynamically scheduled and SPS scheduled services.

In some embodiments, said RAN B uses SPS but actually only uses a fraction of all transmission possibilities allocated for the targeted UE and, in this case, RAN A may be made aware of that (on-the-fly by or via the targeted UE) so that RAN A could use the other slots to schedule for the targeted UE. That is, the targeted UE indicates RAN A about the unused (or actually used) slots of RAN B allocated SPS, as determined by the targeted UE or requested by RAN B.

In some embodiments, dynamic scheduling and SPS are coordinated such that RAN-switching time is considered (e.g., switching from 3G to 4G takes some time which should be considered in the schedule).

In some embodiments, when SPS based coordination specific to the targeted UE directly with the targeted UE is not possible or preferable, the coordination may be based on utilizing a D2D connection (e.g. operator B's UE may use D2D link to operator A's UE for accessing operator A's NW for V2X UL transmission). This way, both A's and B's RANs may keep using dynamic scheduling towards A's UE and B's UE with respect to D2D connection which can be using either dynamic or SPS allocation from either A's RAN or B's RAN.

In some embodiments, information related to the UE specific SPS based coordination of the targeted UE is transferred to a target eNB during the HO procedure. This may be done either via the RRC container sent to target eNB, or by the targeted UE. The latter is preferable in UE initiated HO.

Legacy RANs may not provide the SPS capability information. Hence, in some embodiments of the invention, absence of the SPS capability information may be considered as an information that the network is not capable of SPS. Thus, a mixture of legacy networks and networks according to some embodiments of the invention may be deployed.

Some embodiments of the invention are described with respect to two scheduling modes: dynamic scheduling and semi-persistent scheduling. Typically, these two modes are the most dominant ones. The static mode (static scheduling) may be considered as a special case of SPS. In some embodiments, there may be further mode(s), e.g. based on random selection or any hybrid option of these modes. In these embodiments, prioritization and/or preemption may be used to handle multiple scheduling modes in general. For example, other modes than dynamic and semi-persistent scheduling may be used only if a resource is exclusively scheduled for the UE by the particular network.

Figure 1:
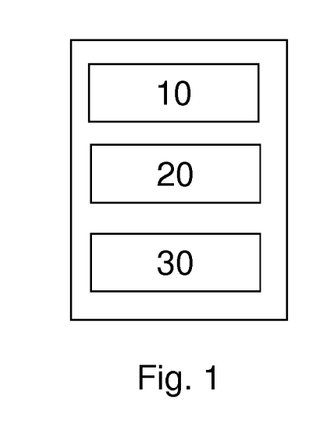
FIG. 1 shows an apparatus according to an example embodiment of the invention.
Figure 2:
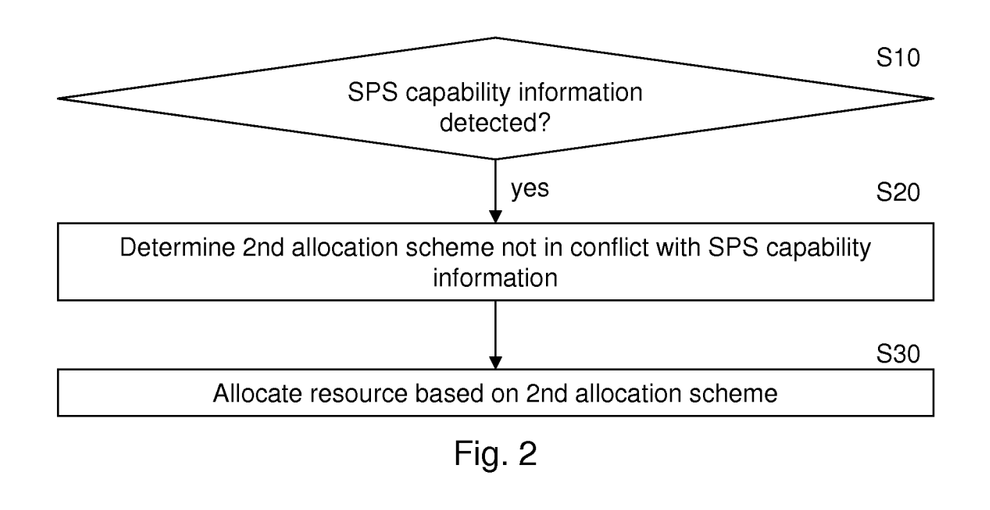
FIG. 2 shows a method according to an example embodiment of the invention.

FIG. 1 shows an apparatus according to an example embodiment of the invention. The apparatus may be a network such as a cell, an eNodeB, or an element thereof. FIG. 2 shows a method according to an example embodiment of the invention. The apparatus according to FIG. 1 may perform the method of FIG. 2 but is not limited to this method. The method of FIG. 2 may be performed by the apparatus of FIG. 1 but is not limited to being performed by this apparatus.

The apparatus comprises monitoring means 10, determining means 20, and control means 30. The monitoring means 10, determining means 20, and control means 30 may be a monitoring circuitry, determining circuitry, and control circuitry, respectively.

The monitoring means 10 monitors if a capability information on a capability of a first network for semi-persistent scheduling of a resource for a terminal is received (S10). For example, the capability information may be received from the terminal (e.g. UE) or directly from the first network.

If the capability information is received (S10="yes"), the determining means 20 determines a second allocation scheme of the resource for the terminal (S20). The second allocation scheme is determined such that an allocation of the resource according to the second allocation scheme is not in conflict with an allocation of the resource according to a first allocation scheme, wherein the first allocation scheme is derived from the received capability information. That is, the first allocation scheme represents an allocation scheme potentially applied by the first network (in the view of the apparatus).

The control means 30 controls an allocation device of a second network to allocate the resource to the terminal according to the second allocation scheme (S30). The apparatus may belong to the second network. The second network may be different from the first network.

Figure 3:
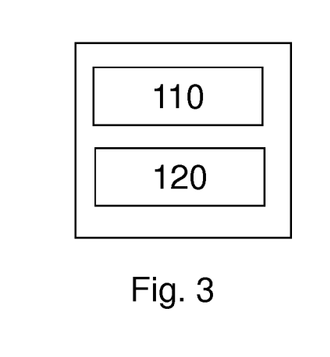
FIG. 3 shows an apparatus according to an example embodiment of the invention.
Figure 4:
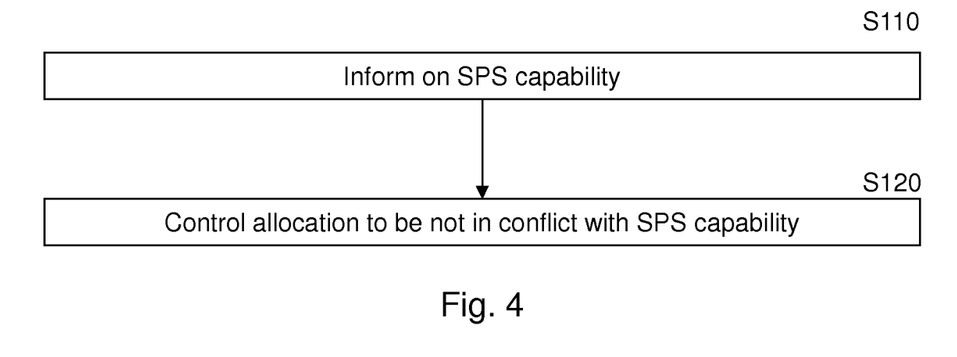
FIG. 4 shows a method according to an example embodiment of the invention.

FIG. 3 shows an apparatus according to an example embodiment of the invention. The apparatus may be a network such as a cell, an eNodeB, or an element thereof. FIG. 4 shows a method according to an example embodiment of the invention. The apparatus according to FIG. 3 may perform the method of FIG. 4 but is not limited to this method. The method of FIG. 4 may be performed by the apparatus of FIG. 3 but is not limited to being performed by this apparatus.

The apparatus comprises providing means 110, and controlling means 120. The providing means 110 and controlling means 120 may be a providing circuitry and a controlling circuitry, respectively.

The providing means 110 provide a capability information on a capability of a network for semi-persistent scheduling of a resource for a terminal (S110). The controlling means 120 controls an allocation device of the network to allocate the resource semi-persistently to the terminal according to the capability (S120). That is, the controlling means 120 controls the allocation device such that the resource is allocated such that it is not in conflict with the indicated capability. However, the allocation device may allocate less of the resource than allowed according to the capability information to the terminal. S110 and S120 may be performed in parallel or at an arbitrary sequence.

Figure 5:
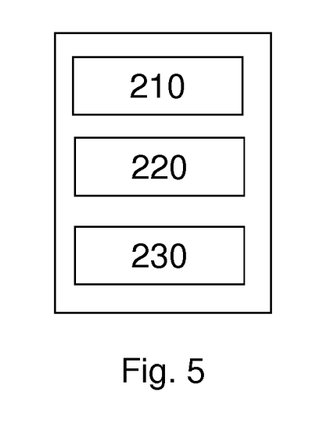
FIG. 5 shows an apparatus according to an example embodiment of the invention.
Figure 6:
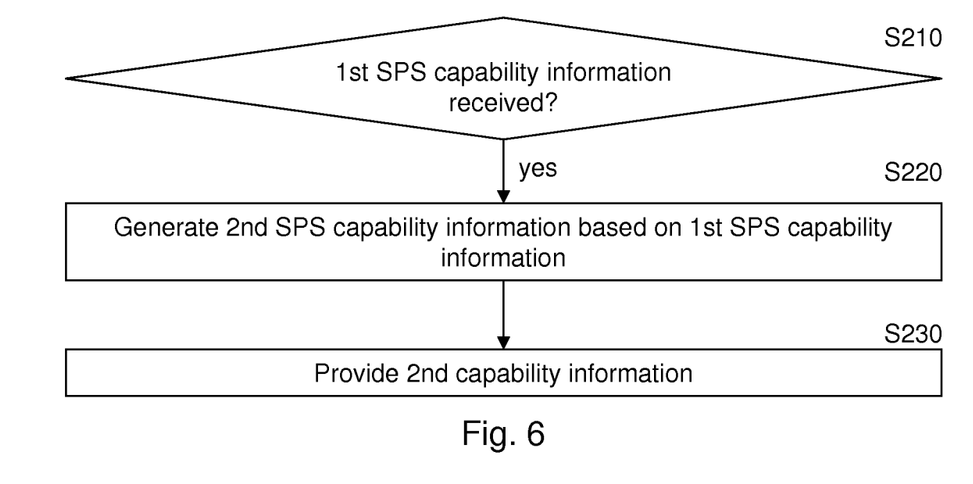
FIG. 6 shows a method according to an example embodiment of the invention.

FIG. 5 shows an apparatus according to an example embodiment of the invention. The apparatus may be a terminal such as a UE, or an element thereof. FIG. 6 shows a method according to an example embodiment of the invention. The apparatus according to FIG. 5 may perform the method of FIG. 6 but is not limited to this method. The method of FIG. 6 may be performed by the apparatus of FIG. 5 but is not limited to being performed by this apparatus.

The apparatus comprises monitoring means 210, generating means 220, and providing means 230. The monitoring means 210, generating means 220, and providing means 230 may be a monitoring circuitry, generating circuitry, and providing circuitry, respectively.

The monitoring means 210 monitors if a first capability information on a capability of a first network for semi-persistent scheduling of a resource is received (S210).

If the first capability information is received (S210="yes"), the generating means 220 generates a second capability information on the capability of the first network for semi-persistent scheduling of the resource based on the first capability information (S220). The second capability information may be e.g. the same as the first capability information or a "translation" of the first capability information into parameters used by the second network.

The providing means 230 provides the second capability information to a second network (S230).

Figure 7:
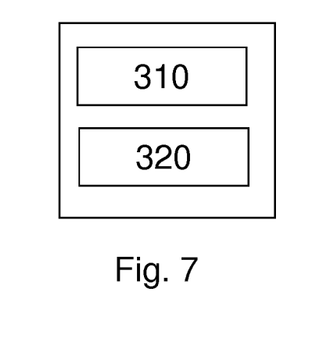
FIG. 7 shows an apparatus according to an example embodiment of the invention.
Figure 8:
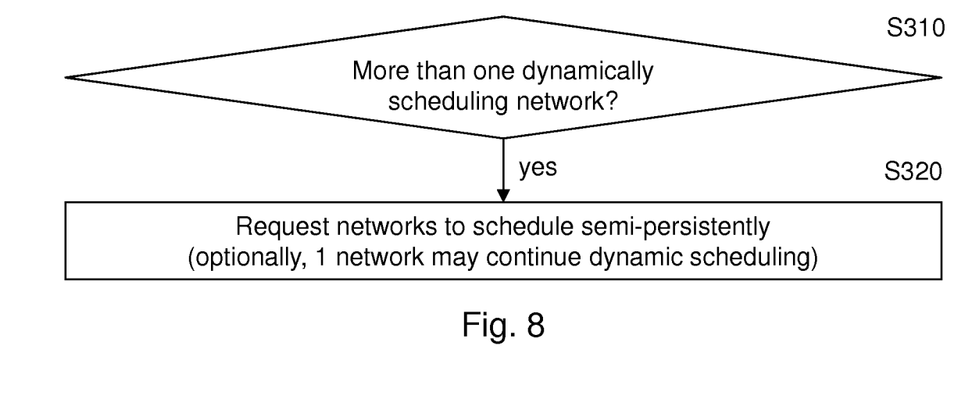
FIG. 8 shows a method according to an example embodiment of the invention.

FIG. 7 shows an apparatus according to an example embodiment of the invention. The apparatus may be a terminal such as a UE, or an element thereof. FIG. 8 shows a method according to an example embodiment of the invention. The apparatus according to FIG. 7 may perform the method of FIG. 8 but is not limited to this method. The method of FIG. 8 may be performed by the apparatus of FIG. 7 but is not limited to being performed by this apparatus.

The apparatus comprises checking means 310 and requesting means 320. The checking means 310 and requesting means 320 may be a checking circuitry and a requesting circuitry, respectively.

The checking means 310 checks if more than one of plural networks serving a terminal schedule a resource dynamically for the terminal (S310).

If more than one of the networks schedules the resource dynamically for the terminal (S310="yes"), the requesting means 320 requests at least one of the dynamically scheduling networks to schedule the resource for the terminal semi-persistently (S320). More in detail, the requesting means requests at least that many of the dynamically scheduling networks to schedule semi-persistently such that not more than one of the networks schedules the resource dynamically.

Figure 9:
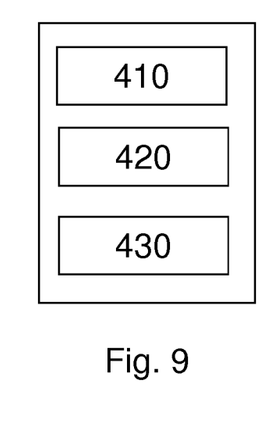
FIG. 9 shows an apparatus according to an example embodiment of the invention.
Figure 10:
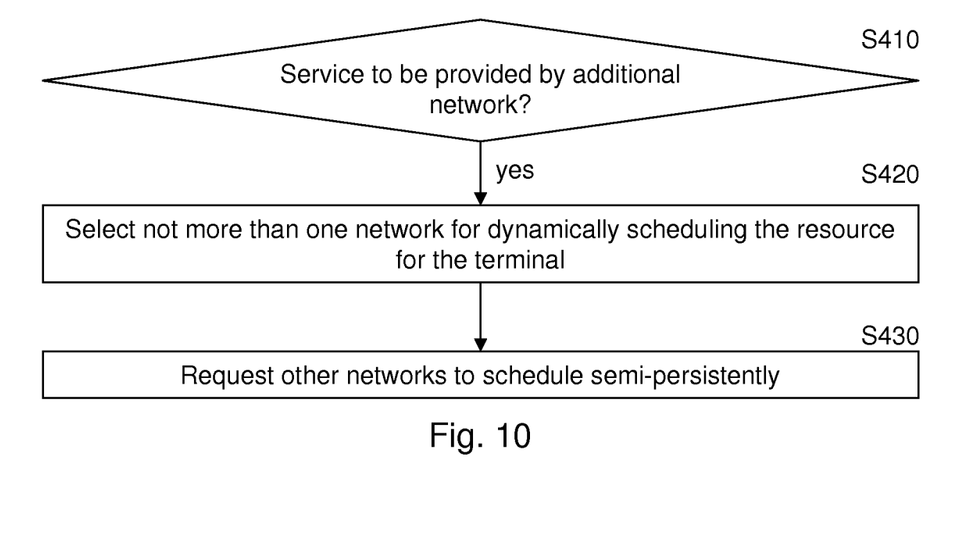
FIG. 10 shows a method according to an example embodiment of the invention.

FIG. 9 shows an apparatus according to an example embodiment of the invention. The apparatus may be a terminal such as a UE, or an element thereof. FIG. 10 shows a method according to an example embodiment of the invention. The apparatus according to FIG. 9 may perform the method of FIG. 10 but is not limited to this method. The method of FIG. 10 may be performed by the apparatus of FIG. 9 but is not limited to being performed by this apparatus.

The apparatus comprises monitoring means 410, selecting means 420, and requesting means 430. The monitoring means 410, selecting means 420, and requesting means 430 may be a monitoring circuitry, a selecting circuitry, and a requesting circuitry, respectively.

The monitoring means 410 monitor if a service is to be provided to a terminal by a resource of an additional network not yet serving the terminal (S410).

If the service is to be provided by the resource of the additional network (S410="yes"), the selecting means 420 selects not more than one network to allocate the resource to the terminal dynamically (S420). The not more than one network is selected out of one or more serving networks and the additional network, wherein each of the one or more serving networks is serving the terminal.

The requesting means 430 requests each one of the other networks (i.e. of the one or more serving networks and the additional network not selected by the selecting means 420) to allocate the resource for the terminal semi-persistently (S430). If the terminal knows that a network is scheduling the resource for the terminal semi-permanently (due to the received parameters for semi-permanent scheduling), it may omit to request this particular network to schedule the resource for the terminal semi-permanently.

Figure 11:
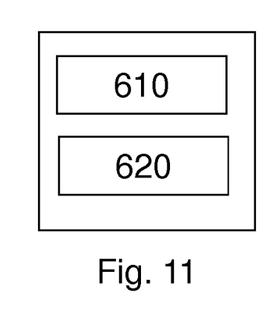
FIG. 11 shows an apparatus according to an example embodiment of the invention.

FIG. 11 shows an apparatus according to an example embodiment of the invention. The apparatus comprises at least one processor 610, at least one memory 620 including computer program code, and the at least one processor 610, with the at least one memory 620 and the computer program code, being arranged to cause the apparatus to at least perform at least one of the methods according to FIGS. 2, 4, 6, 8, and 10 and related description.

A RAN may be represented by e.g. an individual eNB, an individual cell, a collection of jointly administered eNBs, or a collection of jointly administered cells. That is, different cells (eNBs) of a network may have different SPS capabilities. In this case, the SPS capability may be that of the respective cell (eNB). Alternatively, the SPS capability may be that of the cell (eNB) with the least SPS capability of the cells (eNBs) of the network.

Embodiments of the invention may be employed in different radio technologies, such as 3G, 4G, 5G networks of 3GPP, a WiFi network, or a V2X network and/or in the respective terminals. The base stations may be those of the respective technology, such as NodeB or eNodeB or an access point. The control functions of the radio network may be fully or partly located in the base station (e.g. in an eNodeB) or in a separate control entity such as a radio network controller.

A terminal may be a terminal of the respective network. E.g., it may be a UE, a smartphone, a laptop, a computer, a D2D device, an MTC device, a mobile phone, etc.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Embodiments of the invention may be employed fully or partly in the cloud, wherein a resource (e.g. processor, software, memory, network) for the respective task may be shared with other applications.

According to the above description, it should thus be apparent that example embodiments of the present invention provide, for example a control device for a radio network such as an eNodeB, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example a terminal such as an UE, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques, means, entities, units, devices, or methods include, as non-limiting examples, implementations as hardware, software, firmware, special purpose circuits or logic, general purpose hardware or controller or other computing devices, a virtual machine, or some combination thereof.

It should be noted that the description of the embodiments is given by way of example only and that various modifications may be made without departing from the scope of the invention as defined by the appended claims.

The invention claimed is:

1. Apparatus, comprising
at least one memory including computer program code; and
at least one processor,
the at least one processor, with the at least one memory and the computer program code, being arranged to cause the apparatus to at least perform the following:
receive, from a terminal connected to a first network, capability information on capability of a first network for semi-persistent scheduling of a resource for the terminal, the capability information received at a second network, the capability information including both capability information specific to the first network and capability information specific to the terminal,
determine, in response to the capability information being received, a second allocation scheme of the resource for the terminal such that an allocation of the resource according to the second allocation scheme is not in conflict with an allocation of the resource according to a first allocation scheme derived from the received capability information; and
control the second network to allocate the resource to the terminal according to the second allocation scheme.

2. The apparatus according to claim 1, wherein
the capability information specific to the terminal comprises information on the semi-persistent scheduling actually applied by the first network for the terminal; and
the determining the second allocation scheme determines the second allocation scheme such that the second allocation scheme is not in conflict with the actually applied semi-persistent scheduling by the first network.

3. The apparatus of claim 1, wherein radio access networks in the first and second networks are different networks and belong to different parties.

4. The apparatus of claim 3, wherein the radio access networks for the different parties belong to at least one of the following: different administrative network domains; different radio technologies; systems of different operators; different network slices; different radio access technologies; different access points; or different operation modes.

5. The apparatus of claim 1, wherein the capability information comprises an indication whether and how semi-persistent scheduling is supported by at least by the first network.

6. The apparatus of claim 5, wherein the capability information comprises semi-persistent scheduling-related system items and constraints comprising one or more of the following: radio access technology-specific characteristics; timing or synchronization references; resources and resource allocation granularities.

7. The apparatus of claim 5, wherein the indication how semi-persistent scheduling is supported comprises whether or not semi-persistent scheduling can be provided to a visitor user equipment directly or only indirectly via a home user equipment which has a device-to-device connection with the visitor user equipment.

8. Apparatus, comprising
at least one memory including computer program code; and
at least one processor,
the at least one processor, with the at least one memory and the computer program code, being arranged to cause the apparatus to at least perform the following:
provide, from a first network to a terminal, capability information on a capability of the first network for semi-persistent scheduling of a resource for the terminal, the provided capability information to be sent by the terminal to a second network for coordination between first and second networks of semi-persistent resource allocation, the capability information including both capability information specific to the first network and capability information specific to the terminal;
control an allocation of the first network to allocate the resource semi-persistently to the terminal according to the capability.

9. The apparatus according to claim 8, wherein the capability information capability information specific to the terminal comprises information on the semi-persistent scheduling actually applied by the network for the terminal.

10. The apparatus of claim 8, wherein radio access networks in the first and second networks are different networks and belong to different parties.

11. The apparatus of claim 10, wherein the radio access networks for the different parties belong to at least one of the following: different administrative network domains; different radio technologies; systems of different operators; different network slices; different radio access technologies; different access points; or different operation modes.

12. The apparatus of claim 10, wherein the radio access networks for the different parties belong to at least one of the following: different administrative network domains; different radio technologies; systems of different operators; different network slices; different radio access technologies; different access points; or different operation modes.

13. The apparatus of claim 8, wherein the capability information comprises an indication whether and how semi-persistent scheduling is supported by at least by the first network.

14. The apparatus of claim 13, wherein the capability information comprises semi-persistent scheduling-related system items and constraints comprising one or more of the following: radio access technology-specific characteristics; timing or synchronization references; resources and resource allocation granularities.

15. Apparatus, comprising
at least one memory including computer program code; and
at least one processor,
the at least one processor, with the at least one memory and the computer program code, being arranged to cause the apparatus to at least perform the following:
monitor by a terminal able to communicate with a first network and a second network whether first capability information on both capability of the first network and the terminal for semi-persistent scheduling of a resource is received;
generate, in response to the first capability information being received, by the terminal second capability information on both the capability of the first network and the terminal for semi-persistent scheduling of the resource based at least on the first capability information; and
provide by the terminal the second capability information to the second network.

16. The apparatus according to claim 15, wherein the generating of the second capability information comprises translating by the terminal first parameters of the first network comprised in the first capability information into second parameters of the second network comprised in the second capability information.

17. The apparatus of claim 16, wherein translating comprises translated by the terminal first parameters of the first network using a first radio access technology into second parameters of the second network using a second, different radio access technology.

18. The apparatus according to claim 15, wherein the at least one processor, with the at least one memory and the computer program code, are further arranged to cause the apparatus to at least perform the following:
communicate by the terminal with the first network using the resource and to communicate by the terminal with the second network using the resource.

19. The apparatus of claim 15, wherein radio access networks in the first and second networks are different networks and belong to different parties.

20. The apparatus of claim 15, wherein the capability information comprises an indication whether and how semi-persistent scheduling is supported by at least by the first network.

* * * * *